United States Patent Office 3,449,405
Patented June 10, 1969

3,449,405
2-HALO-3-METHYLPHENYL N-METHYLCARBAMATES
Ichiro Seto, Humikazu Tanaka, Yoshio Ishii, Yuji Nagae, and Setsuo Kitakata, Kanagawa-ken, Japan, assignors to Toa Noyaku Kabushiki Kaisha, Tokyo, Japan, a corporation of Japan
No Drawing. Filed Feb. 4, 1966, Ser. No. 525,123
Int. Cl. C07c 69/02; A01n 9/20
U.S. Cl. 260—479
3 Claims

ABSTRACT OF THE DISCLOSURE 2-halo-3-methylphenyl N-methylcarbamates of the following formula

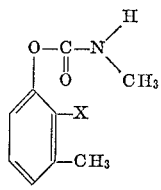

wherein X is selected from the group consisting of chlorine and bromine atoms, and the process of combating green rice leaf hoppers comprising contacting said hoppers with an effective amount of one of the above compounds.

---

The present invention relates the new halogen- and methyl-substituted-phenyl N-methylcarbamates which are found to possess remarkably high insecticidal activity, to their preparations and to the insecticidal compositions.

We have found that the new halogen- and methyl-substituted phenyl N-methylcarbamates had strong activities in controlling and killing injurious insects such as house flies, plant-hopper and leaf-hoppers which are also very harmful to men and cultivated rice plants.

Following the present invention, we prepare new halogen- and methyl-substituted phenyl N-methylcarbamates which have the following formula:

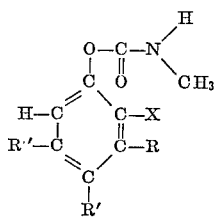

wherein R' indicates a hydrogen atom and methyl radical; when R' is hydrogen, X is selected from the group consisting of a halogen atom and methyl radical, R and R' is selected from the group consisting of a hydrogen atom, halogen atom and methyl radical, and R" is hydrogen or halogen but X, R and R' should be different from each other in each compound, and when R' is methyl, X is a halogen atom, and R is methyl radical, and R' is hydrogen atom.

R. L. Metcalf et al. reported a kind of halogen- and methyl-substituted-phenyl N-methylcarbamates in the Journal of Economic Entomolgy, vol. 56, No. 6, 862 (1963) by the title of "Carbamate Insecticides: Multi-Substituted Chloro and Methylphenyl N-Methyl-Carbamates," and the related compounds such as halogen or alkyl substituted phenyl N-methylcarbamates, particularly 2-halo and 2,4-dihaloalkylphenyl carbamates were reported to possess an insecticidal activity (refer to British Patent No. 934,576 published on Aug. 21, 1963 and U.S. Patent No. 3,131,215 published on Apr. 23, 1964). However, the new halogen and methyl-substituted-phenyl N-methylcarbamates of the present invention are not disclosed in the above-mentioned publications.

We also have much interests in many other carbamic acide esters which have a higher selective toxicity to insects and systemic action in the cultivated plants and also a lower toxicity to warm-blooded animals. We investigated physiological activity of a series of carbamic acid esters against injurious insects such as house fly (*Musca domestica*), green rice leaf-hopper (*Nephotettix cincticeps*), white-backed planthopper (*Sagatella furcifera*), and brown plant-hopper (*Nilaparvata lugens*) which are very harmful to rice plants cultivated mainly in Asia, including Japan. As a result, we found that 2-chlorophenyl N-methylcarbamate showed an unprecedented higher insecticidal activity against rice leaf-hoppers and had very high knock down rates to injurious insects, and also found to maintain the insecticidal activity even at a low temperature. This 2-chlorophenyl N-methylcarbamate was disclosed in a co-pending Japanese patent application No. 59,145/1962.

Comparing 2-chlorophenyl N-methylcarbamate and the well known insecticidal compounds of carbamate group, the new halogen- and methyl-substituted-phenyl N-methylcarbamates of the present invention have much higher insecticidal activity and stability than the above-mentioned carbamate compounds in the chemical and biological conditions. As shown in the present invention, the new halogen- and methyl-substituted-phenyl N-methyl-carbamates have the higher insecticidal activity and stability which are supposed to be produced from methyl substituent on the benzene ring and stabilize the N-methylcarbamates and enhance the insecticidal activity of the halogen atom attached to the benzene ring.

The new halogen- and methyl-substituted phenyl N-methylcarbamates include the following chemical in the scope of the present invention.

Compounds 2-chloro-3-methylphenyl N-methylcarbamate, M.P. 110–110 C.
2-bromo-3-methylphenyl N-methylcarbamate, M.P. 107–110° C.
2-chloro-5-methylphenyl N-methylcarbamate, M.P. 77–85° C.
3-chloro-2-methylphenyl N-methylcarbamate, M.P. 107–108° C.
5-chloro-2-methylphenyl N-methylcarbamate, M.P. 77° C.
5-bromo-2-methylphenyl N-methylcarbamate, M.P. 83–84° C.
5-iodo-2-methylphenyl N-methylcarbamate, M.P. 110° C.
2-chloro-3, 4-dimethylphenyl N-methylcarbamate, M.P. 130–132° C.
2-bromo-3,4-dimethylphenyl N-methylcarbamate, M.P. 124–125° C.

R. L. Metcalf et al., J. Econ. Entomol., vol. 56, No. 6, 862 (1963); Kazuo Konishi et al., Japanese Patent No. 22,458 (1965); and M. H. J. Weiden et al., J. Agr. Food Chem., vol. 13, No. 3, 200 (1965) reported the following compounds:

2-chloro-4-methylphenyl N-methylcarbamate, M.P. 100–102° C.
2-chloro-6-methylphenyl N-methylcarbamate, M.P. 101–104° C.
4-chloro-2-methylphenyl N-methylcarbamate, M.P. 101° C.
4-chloro-3-methylphenyl N-methylcarbamate, M.P. 113° C.

The present invention also is concerned with an insecticidal composition which contains as the active ingredient at least one of the new halogen- and methyl-substituted-phenyl N-methylcarbamates as identified above, and an inert diluent. And if desired, it may contain also at least one material selected from the group consisting of a dispersing agent, surface-active agent, solvent, emulsifying agent, binding agent and stabilizer. Appropriate carriers include solid diluent such as talc, clay, bentonite and the like, so that the composition may be also prepared in the form of wettable powder in which the active ingredient is admixed with a dispersing agent such as sodium or calcium lignin-sulfonate, and a surface-active agent such as polyoxyethylene alkylaryl ethers and an inert solid diluent such diatomaceous clay, clay, etc. The composition may be also prepared in the form of solution in organic solvent or emulsion in which the active ingredient is dissolved in a solvent such as toluene, xylene, methyl-naphthalene and dimethylformamide together with an emulsifying agent such as "Solpol-9268" (a trade name of a product of Toho Kagaku Co., Ltd. in Japan) and other well-known appropriate ionic and non-ionic surface agents. Furthermore, the composition may be also prepared in the form of granules or pellets in which the active ingredient is admixed with inert solid carrier or diluent and a blinding agent such as polyvinyl alcohol, arabian gum, and sodium-lignin sulfonate.

In addition to the new halogen- and methyl-substituted-phenyl N-methylcarbamates of the present invention, the insecticidal composition may contain other physiologically active materials such as other known insecticides, fungicides, herbicides, plant growth-regulating agents and fertilizers.

Other known insecticides which may additionally be incorporated with the composition of the present invention, include organic phosphorous insecticides such as parathion, tetraethyl pyrophosphate; chlorine-containing insecticides such as DDT and BHC; carbamate-type insecticides such as "Sevin," that is, 1-naphthyl N-methylcarbamate; and natural insecticides such as rotenone and pyrethrin. Furthermore, fungicides which may be incorporated with the composition of the present invention include sulfur-containing fungicides such as dithio-carbamic acid salts or their derivatives; organo metal fungicides such as phenyl mercuric acetate, phenyl mercuric iodide and cadmium compounds. Appropriate herbicides which may be used, include pentachloro-phenyl or its sodium salt, urea-type herbicides, carbamate-type herbicides, phenoxy-type herbicides, triazine-type herbicides and the like. Of course, the new halogen- and methyl-substituted-phenyl N-methylcarbamate of the present invention may be applied directly in admixture with the above-mentioned physiologically active materials.

The new halogen- and methyl-substituted phenyl N-methylcarbamates of the present invention may be prepared either by reacting methyl isocyanate or methylcarbamyl chloride with a halogen- and methyl-substituted phenol of the following formula:

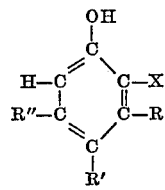

wherein X, R, R' and R" have the same meaning as defined hereinbefore, or by reacting phosgene with the halogen- and methyl-substituted phenol of the above mentioned formula to give the corresponding chloroformic acid ester which is then reacted with monomethyl-amine, or by reacting monomethylamine with bis(halogen-substituted cresyl) carbonate.

The reaction of methyl isocyanate with the halogen- and methyl-substituted phenol of the aforesaid formula may suitably be carried out at an elevated temperature and in the reaction medium consisting of one or more of solvents such as liquid aliphatic hydrocarbons such as n-hexane and ligroin; aromatic hydrocarbon such as benzene, toluene and xylenes; ethers such as acetone and dioxane; and halogenated aliphatic and aromatic hydrocarbons. This reaction, if desired, may be promoted by providing in the reaction medium the presence of a catalyst which may be tertiary amines such as triethyl amine, pyridine and dialkyl aniline. The reaction of phosgene with the halogen- and methyl-substituted phenol of the aforesaid formula may similarly be carried out in the reaction medium comprising the above mentioned solvents to give the corresponding chloroformic acid ester, and this reaction may suitably be carried out in the presence of a dehydrochlorination agent such as an alkali metal hydroxide, e.g., sodium hydroxide and a tertiary amine. The further reaction of monomethylamine with previously mentioned corresponding chloroformic acid ester may conveniently be carried out at a relatively low temperature of —50° C. to 5° C., using monomethylamine in excess, e.g., an amount of about twice as much as the quantity of the ester or using a mixture of monomethylamine and a tertiary amine as the acid-binding agent.

The following examples are given to illustrate the present invention; the parts and percentages are indicated by weight unless otherwise indicated.

EXAMPLE 1

13 parts of methyl isocyanate were added to a mixture comprising 30 parts of 2-chloro-3-methylphenol, 100 parts of toluene and 0.1 part of triethyl amine in a pressure vessel in cooling condition, and the vessel was closed as soon as the addition of methyl isocyanate had been completed. After cooling, the agitation was continued for a while, and then the vessel was allowed to be warmed to room temperature. After that, it was heated to 100° C. and maintained at this temperature for 8 hours. After cooling, the reaction vessel was opened and its content was distilled to remove the solvent and un-reacted materials. The residue was recrystallized from mixture of ligroin and toluene, treated with active carbon to yield 37 parts of 2-chloro-3-methylphenl N-methylcarbamate of lustrous prism (M.P. 110–111° C.).

Analysis.—Calculated: C, 54.14%; H, 5.05%; N, 7.02%. Found: C, 53.78%; H, 5.08%; N, 7.12%.

EXAMPLE 2

75 parts of a 20% solution of monomethylamine in toluene were added dropwise for one hour in cooling condition (temperature 0–5% C.) into a liquid mixture of 500 parts of ligroin and 51.3 parts of 2-chloro-3-methyl-phenyl chloroformate (boiling point: 118–124° C./25 mm. Hg) which had been prepared by reacting phosgene with 2-chloro-3-methylphenol. The reaction mixture was then agitated in cooling condition for one hour after the addition of monomethylamine, and subsequently warmed to 20–25° C. and maintained this temperature for 3 hours. The monomethylamine hydrochloride was removed out of the reaction mixture by extracting with 500 parts of water, the filtrate was separated, and the ligroin layer was distilled. Recrystallization of the residue from ligroin yielded 40 parts of 2-chloro-3-methylphenyl N-methylcarbamate of lustrous prism (M.P. 108–110° C.).

EXAMPLE 3

1.3 parts of methyl isocyanate were added to a mixture of 3 parts of 3-chloro-2-methyl phenol, 20 parts of xylene and 0.1 part of dimethylaniline in an autoclave, and the autoclave was then closed and the reaction mixture was kept at room temperature for 8 days. The reaction mixture was then distilled to remove xylene, dimethylaniline and the unrecated methyl isocyanate. The residue was dissolved in hot toluene, and treated with active carbon and recrystallized to yield 3.9 parts of 3-chloro-2-methylphenyl N-methylcarbamate of pale yellow needle crystal (M.P. 105–6° C.).

*Analysis.*—Calculated: N, 7.04%. Found: N, 7.04%.

EXAMPLE 4

102 parts of a 30% aqueous solution of monomethyl amine were added dropwise for 1.5 hours in cooling condition (at a temperature of −5–10° C.) into a mixture consisting of 800 parts of n-hexane and 102.6 parts of 2-chloro-5-methylphenyl chloroformate which has been obtained by reacting phosgene with 2-chloro-5-methylphenol. The reaction mixture was vigorously agitated in cooling condition for 3 hours after the addition of the monomethyl amine solution, and then added with 400 parts of water. The agitation was continued for a while. The solid product was collected and washed with diluted hydrochloric acid and with water, and then dried to yield 80 parts of crude 2-chloro-5-methylphenyl N-methylcarbamate (M.P. 74–75° C.).

EXAMPLE 5

18 parts of methyl isocyanate were reacted with a mixture of 56 parts of 2-bromo-3-methylphenol, 150 parts of toluene and two drops of triethyl amine in a closed autoclave at a temperature of 95–8° C. for 8 hours. The reaction mixture was then distilled to remove the solvent and the unreacted materials. Recrystallization of the residue from ligroin yielded 70 parts of 2-bromo-3-methylphenyl-N-methylcarbamate of lustrous prism (M.P. 107–110° C.).

*Analysis.*—Calculated: N, 5.74%. Found: N, 5.93%.

EXAMPLE 6

Example 1 was repeated using 2.8 parts of methyl isocyanate, 8.2 parts of 5-bromo-2-methylphenol, 20 parts of toluene and one drop of dimethyl aniline. Thus 9.6 parts of 5-bromo-2-methylphenyl N-methylcarbamate of lustrous prism (M.P. 83–4° C.) were obtained.

*Analysis.*—Calculated: N, 5.74%. Found: N, 6.00%.

EXAMPLE 7

50 parts of a 30% aqueous solution of monomethyl amine were added to a solution of 74 parts of 5-iodo-2-methylphenyl chloroformate and 500 parts of toluene, and the prepared mixture was vigorously agitated for 5 hours in cooling condition. The monomethyl amine hydrochloride was removed out by extracting with water and the mixture was distilled to remove the solvent. Recrystallization of the residue from ligroin yielded 60 parts of 5-iodo-2-methylphenyl N-methylcarbamate of white leaflet (M.P. 110° C.).

*Analysis.*—Calculated: N, 4.81%. Found: N, 4.81%.

EXAMPLE 8

Example 1 was repeated employing 2.4 parts of methyl isocyanate, 6 parts of 5-chloro-2-methylphenol, 15 parts of toluene and one drop of triethyl amine. There were yielded 7.5 parts of 5-chloro-2-methylphenyl N-methylcarbamate of lustrous needle (M.P. 77° C.).

*Analysis.*—Calculated: N, 7.02%. Found: N, 7.08%.

EXAMPLE 9

50 parts of 2-chloro-3,4-dimethylphenol were added into a solution of 12.8 parts of sodium hydroxide in 150 parts of water, and the mixture was then heated for 30 minutes at 70–80° C. with stirring to form the sodium salt which was then added with 50 parts of toluene in cooling condition of a temperature of lower than 20° C. and then dropwise with a solution of 33 parts of phosgene in 150 parts of toluene. The prepared mixture was vigorously stirred in keeping at 20–25° C. for 2 hours and then allowed to stand so as to separate the toluene phase. This toluene solution was treated so as to remove the excess of phosgene and then dried with anhydrous sodium sulfate. This toluene solution were dropwise added with a mixture of 20 parts of monomethylamine in 200 parts of toluene at a temperature of lower than 10° C. The mixture was then treated so as to remove the monomethyl amine hydrochloride and distill the toluene. Recrystallization of the residue from ligroin yielded 48 parts of 2-chloro-3,4-dimethylphenyl N-methylcarbamate of white-grossy needle (M.P. 130–2° C.).

*Analysis.*—Calculated: C, 56.21%; H, 5.66% N, 6.56%. Found: C, 55.97%; H, 5.58%; N, 6.81%.

EXAMPLE 10

Example 1 was repeated using 20 parts of methyl isocyanate, 60 parts of 2-bromo-3,4-dimethylphenol, 150 parts of toluene and 0.1 part of triethyl amine. Thus 75 parts of 2-bromo-3,4-dimethylphenyl N-methylcarbamate of white crystal were yielded (M.P. 124–5° C.).

*Analysis.*—Calculated: N, 5.47%. Found: N, 5.69%.

EXAMPLE 11

An insecticidal composition in the form of dust, containing 3% of the active ingredient was prepared by grinding together with 3 parts of 2-chloro-5-methylphenyl N-methylcarbamate and 50 parts of talc and 47 parts of clay as carrier sufficiently so that the active ingredient was uniformly distributed in the carrier.

EXAMPLE 12

An insecticidal composition in the form of wettable powder, containing 50% of the active ingredient was prepared by grinding together 50 parts of 2-chloro-3-methylphenyl N-methylcarbamate, 47 parts of clay, 1 part of sodium lignin-sulfonate and 2 parts of "Triton X 100" (a registered trade name of a surface-active agent mainly consisting of polyethylene glycol alkylphenyl ether, produced by Rohm & Hass Co.).

EXAMPLE 13

An insecticidal composition in the form of emulsion containing 20% of the active ingredient was prepared by dissolving 20 parts of 2-bromo-3-methylphenyl N-methylcarbamate and 20 parts of "Solpol-9268" (a trade name of an emulsifying agent produced by To-ho Kagaku Co.) in a mixture comprising 30 parts of dimethylformamide and 30 parts of methyl-naphthalene.

EXAMPLE 14

As insecticidal composition in the form of granules, containing 10% of the active ingredient was prepared by mixing intimately 10 parts of 2-bromo-5-methylphenyl N-methylcarbamate, 57 parts of sericite, 30 parts of talc, 1 part of carboxymethyl cellulose, 15 parts of sodium lignin-sulfonate and 0.5 part of "Solpol-8070" together and then the prepared admixture was granulated adding with a small amount of water and then dried to granules.

The following examples are given to illustrate the insecticidal activity of the new halogen- and methyl-substituted phenyl N-methylcarbamate of the present invention comparing with the already known insecticides.

EXAMPLE 15

In this example, the insecticidal activity of the halogen- and methyl-substituted phenyl N-methylcarbamate of the present invention was tested against female adult of green rice leaf-hoppers (*Nephotettix cinceticeps*).

The procedure of test was as follows: Rice plants cultivated in a small pot of 9 cm. in height and 9 cm. in diameter were covered by a cylindrical cage of 25 cm. in height and 7 cm. in diameter. Twenty adult female green rice leaf-hoppers were kept within the cylinder cage. A series of test solution of the compounds listed below as the active ingredient at a concentration of 0.025% by weight were prepared by diluting with water emulsions which contained 20% of the active ingredient and had been prepared as shown in Example 16. 20 millilitres of each test solution was sprayed uniformly onto the insects by using a glass sprayer which was placed at a distance of 1 metre from said pot on a rotating turn-table and at that time the sprayer had air pressure in its storage tank at 5 pounds per square inch. This test was repeated five times, so that the insecticidal activities of the compounds would be estimated for 100 insects. The assessment of mortality was done for each test. The results are shown in the following Table 1 which indicate the average value of these five replications of the test.

minutes) to knock down 50% of the number of the tested insects). The value of "$KT_{50}$" means that insecticides are superior to be used practically. This test was carried out within a conditioned chamber which was kept at 25° C., because the speed of the insecticidal action of the chemicals was very sensitive to the temperature. The results are summarised in the following Table 2, which indicates the average value of five replications of the test.

TABLE 2

| | Number of tested insects | Concentration of active ingredient, percent | Knock down percentages of number of insects — Time after spraying (in minutes) | | | | | | | | $KT_{50}$ (in minutes) |
|---|---|---|---|---|---|---|---|---|---|---|---|
| | | | 10 | 20 | 40 | 60 | 120 | 240 | 360 | 420 | |
| Tested compounds: | | | | | | | | | | | |
| 2-chloro-3-methylphenyl N-methylcarbamate | 100 | 0.025 | 4 | 36 | 78 | 99 | 100 | | | | 30 |
| 2-chloro-5-methylphenyl N-methylcarbamate | 100 | 0.025 | 4 | 35 | 98 | 100 | | | | | 19 |
| 2-bromo-3-methylphenyl N-methylcarbamate | 100 | 0.025 | 4 | 30 | 98 | 100 | | | | | 19 |
| 2-methyl-5-chlorophenyl N-methylcarbamate | 100 | 0.025 | 0 | 4 | 46 | 60 | 92 | 98 | 100 | | 58 |
| 2-bromo-5-methylphenyl N-methylcarbamate | 100 | 0.025 | 0 | 4 | 50 | 80 | 100 | | | | 41 |
| 2-methyl-5-bromophenyl N-methylcarbamate | 100 | 0.025 | 0 | 5 | 25 | 40 | 69 | 80 | 98 | 100 | 107 |
| 2-iodo-5-methylphenyl N-methylcarbamate | 100 | 0.025 | 0 | 0 | 3 | 45 | 80 | 100 | | | 55 |
| 2-methyl-5-iodophenyl N-methylcarbamate | 100 | 0.025 | 0 | 20 | 30 | 40 | 74 | 100 | | | 61 |
| 2-methyl-3-chlorophenyl N-methylcarbamate | 100 | 0.025 | 0 | 0 | 20 | 45 | 70 | 100 | | | 68 |
| 2-chloro-3,4-dimethylphenyl N-methylcarbamate | 100 | 0.025 | 0 | 0 | 19 | 43 | 91 | 100 | | | 68 |
| 2-bromo-3,4-dimethylphenyl N-methylcarbamate | 100 | 0.025 | 0 | 10 | 40 | 70 | 100 | | | | 46 |
| Comparative: | | | | | | | | | | | |
| 2-chloro-4-methylphenyl N-methylcarbamate | 100 | 0.025 | 0 | 5 | 5 | 10 | 40 | 65 | | | 151 |
| 4-chloro-3-methylphenyl N-methylcarbamate | 100 | 0.025 | 0 | 0 | 0 | 0 | 10 | 35 | | | >300 |
| 3-chloro-4-methylphenyl N-methylcarbamate | 100 | 0.025 | 0 | 0 | 0 | 0 | 5 | 40 | 60 | | >300 |
| 3-bromo-4-methylphenyl N-methylcarbamate | 100 | 0.025 | 0 | 0 | 0 | 0 | 4 | 35 | 45 | | >300 |
| 4-bromo-3-methylphenyl N-methylcarbamate | 100 | 0.025 | 0 | 0 | 0 | 0 | 15 | 45 | 70 | 93 | 188 |
| Sevin (1-naphthyl N-methylcarbamate) | 100 | 0.025 | 0 | 0 | 0 | 2 | 30 | 82 | 97 | 100 | 166 |
| Untreated | 20 | | 0 | 0 | 0 | 0 | 0 | 0 | 0 | 0 | |

NOTE.—Twenty female adults of green rice leaf-hoppers were kept without the application of the chemical under similar conditions as control.

TABLE 1

| Tested compounds: | Mortality (percent) |
|---|---|
| 2-chloro-3-methylphenyl N-methylcarbamate | 100 |
| 2-chloro-5-methylphenyl N-methylcarbamate | 100 |
| 2-methyl-3-chlorophenyl-N-methylcarbamate | 100 |
| 2-methyl-5-chlorophenyl N-methylcarbamate | 100 |
| 2-bromo-3-methylphenyl N-methylcarbamate | 100 |
| 2-methyl-5-iodophenyl N-methylcarbamate | 100 |
| 2 - chloro - 3,4 - dimethylphenyl N-methylcarbamate | 100 |
| 2 - bromo - 3,4 - dimethylphenyl N-methylcarbamate | 100 |
| Comparative: | |
| 2-chloro-4-methylphenyl N-methylcarbamate | 100 |
| 2-chloro-6-methylphenyl N-methylcarbamate | 35 |
| 4-chloro-2-methylphenyl N-methylcarbamate | 45 |
| 4-chloro-3-methylphenyl N-methylcarbamate | 100 |
| 3-chloro-4-methylphenyl N-methylcarbamate | 100 |
| 2-bromo-6-methylphenyl N-methylcarbamate | 5 |
| 3-bromo-4-methylphenyl N-methylcarbamate | 100 |
| 4-bromo-3-methylphenyl N-methylcarbamate | 100 |
| 4-iodo-3-methylphenyl N-methylcarbamate | 85 |
| 1-naphthyl N-methylcarbamate ("Sevin") | 100 |
| DDT | 96 |
| Untreated | 0 |

Note: Green rice leaf-hoppers maintained under similar conditions in the absence of the chemical were unaffected.

EXAMPLE 16

In this example, the speed of the insecticidal action of the new halogen- and methyl-substituted-phenyl N-methylcarbamates of the present invention was tested against female adult of green rice leaf-hoppers (*Nephotettix cincticeps*).

The procedure of test was as follows: The test solution was prepared as shown in Example 18. Knock down percentages of the number of the insects were assessed at regular intervals after spraying of test solution, and further there was calculated "$KT_{50}$," ($KT_{50}$ means a time (in Recently in Japan, green rice leaf-hoppers (*Nephotettix cincticeps*) became to have resistant to Malathion O,O-dimethyl-S-(1,2-diethoxycarbonyl-ethyl dithiophosphate) which is commercially available as "Malathion" (a trade name of the product of A.C.C.) and has been widely used as an agricultural insecticide in Japan. These Malathion green rice leaf-hoppers gave a great damage to the rice crop and brought about an important problem. The new halogen- and methyl substituted phenyl N-methylcarbamate of the present invention can give very excellent result for controlling Malathion resistant green rice leaf-hoppers. The following example shows the excellent insecticidal activity of the new compounds of the present invention in this respect.

EXAMPLE 17

Female adult of green rice leaf-hoppers (*Nephotettix cincticeps*) which had the resistance to Malathion were treated with the chemicals in a similar way to Example 18 and the test results were obtained in the same method as shown in Example 19. The following table shows the average value of the test results.

TABLE 3

| Tested compounds | Concentration of active ingredient, percent | Number of tested insects | $KT_{50}$ (in min.) |
|---|---|---|---|
| 2-chloro-3-methylphenyl N-methylcarbamate | 0.025 | 100 | 23 |
| 2-bromo-3-methylphenyl N-methylcarbamate | 0.025 | 100 | 25 |
| 2-chloro-3,4-dimethylphenyl N-methylcarbamate | 0.025 | 100 | 61.7 |
| 2-bromo-3,4-dimethylphenyl N-methylcarbamate | 0.025 | 100 | 44.7 |
| 2-chloro-4-methylphenyl N-methylcarbamate | 0.025 | 100 | >200 |
| 4-chloro-3-methylphenyl N-methylcarbamate | 0.025 | 100 | >200 |
| 3-chloro-4-methylphenyl N-methylcarbamate | 0.025 | 100 | >200 |
| 3-bromo-4-methylphenyl N-methylcarbamate | 0.025 | 100 | >200 |
| 4-bromo-3-methylphenyl N-methylcarbamate | 0.025 | 100 | 180 |
| Malathion (comparative) | 0.025 | 100 | >200 |
| Untreated | | 20 | |

For further comparison, 100 female adult of green rice leaf-hoppers sensitive to Malathion were treated with Malathion at a concentration of 0.025%, and was found that the value of $KT_{50}$ was 36.

EXAMPLE 18

In this example, the insecticidal activity of the new halogen- and methyl-substituted phenyl N-methyl-carbamate of the present invention was tested against white-backed plant hopper (*Sogatella furcifera*) and brown plant hopper (*Nilaparvata lugens*), respectively, in the same method as shown in Examples 18 and 19. In each test, the concentration of the active ingredient was 0.025%. The results are summarised in the following table.

TABLE 4

| Tested compounds | Number of insects tested | | $KT_{50}$ (in minutes) | |
|---|---|---|---|---|
| | Nila-parvata lugens | Soga-tella furcifera | Nila-parvata lugens | Soga-tella furcifera |
| 2-chloro-3-methylphenyl N-methylcarbamate | 98 | 20 | 22 | 118 |
| 2-bromo-3-methylphenyl N-methylcarbamate | 100 | 20 | 20 | 72 |
| 2-chloro-3,4-dimethylphenyl N-methylcarbamate | 100 | 20 | 48 | 124 |
| 2-bromo-3,4-dimethylphenyl N-methylcarbamate | 100 | 20 | 34 | 72 |
| 2-chloro-4-methylphenyl N-methylcarbamate (comparative) | 100 | 20 | >200 | >200 |
| 4-chloro-3-methylphenyl N-methylcarbamate (comparative) | 100 | 20 | >200 | >200 |
| Sevin (1-naphthyl N-methylcarbamate) (comparative) | 100 | 20 | 61 | 159 |
| Untreated | 100 | 20 | | |

EXAMPLE 19

In this example, the insecticidal activity of the halogen- and methyl-substituted phenyl N-methylcarbamates of the present invention was tested against house flies (*Musca domestica*). A series of solutions containing each compound listed below at various concentrations in acetone were prepared and applied in an amount of 0.001 ml. to each house fly. An assessment of mortality was carried out 24 hours after the application of the chemical, and there were calculated the values of $LD_{50}$ (the quantity of the chemical which was required to give 50% mortality of house flies tested). The text results are summarised in the following table.

Table 5

| Tested compounds | $LD_{50}$ (in mg./kg.) |
|---|---|
| 2-methyl-3-chlorophenyl N-methylcarbamate | 287.0. |
| 2-methyl-5-chlorophenyl N-methylcarbamate | 187.9. |
| 2-chloro-3-methylphenyl N-methylcarbamate | 109.7. |
| 2-bromo-3-methylphenyl N-methylcarbamate | 178.2. |
| 2-chloro-3,4-dimethylphenyl N-methylcarbamate | 231.7. |
| 2-bromo-3,4-dimethylphenyl N-methylcarbamate | 26.1. |
| 1-naphthyl N-methylcarbamate (comparative) (Sevin) | Much more than 1000. |

As shown in the above examples, the new halogen- and methyl-substituted phenyl N-methylcarbamates of the present invention are found to be very useful and effective in controlling and exterminating a wide variety of noxious insects.

What we claim is:

1. 2-halo-3-methylphenyl N-methylcarbamates of the following formula

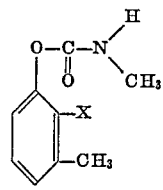

wherein X is selected from the group consisting of chlorine and bromine atoms.

2. 2-chloro-3-methylphenyl N-methylcarbamate.
3. 2-bromo-3-methylphenyl N-methylcarbamate.

References Cited

UNITED STATES PATENTS 3,131,215   4/1964   Lemin _____ 260—479
3,215,595   11/1965   Bocker et al. _____ 260—479

OTHER REFERENCES

Metcalf et al.: "Journal of Economic Entomology," vol. 55, pp. 889–894 (1962).

Metcalf et al.: "Journal of Economic Entomology," vol. 56, pp. 862–864 (1963).

Weiden et al.: "Journal Agric. Food Chem.," vol. 13, No. 3, May–June 1965, pp. 200–4.

Hadaway et al.: "World Health Organ. Bulletin," vol. 32, No. 4, pp. 581–5 (1965).

LORRAINE A. WEINBERGER, *Primary Examiner.*

M. G. BERGER, *Assistant Examiner.*

U.S. Cl. X.R
424—300